(12) United States Patent
Kapoor et al.

(10) Patent No.: US 9,436,826 B2
(45) Date of Patent: Sep. 6, 2016

(54) DISCOVERING MALICIOUS INPUT FILES AND PERFORMING AUTOMATIC AND DISTRIBUTED REMEDIATION

(75) Inventors: Vishal Kapoor, Seattle, WA (US); Jonathan Mark Keller, Redmond, WA (US); Ajith Kumar, Seattle, WA (US); Adrian M. Marinescu, Sammamish, WA (US); Marc E. Seinfeld, Fort Lauderdale, FL (US); Anil Francis Thomas, Redmond, WA (US); Michael Sean Jarrett, Kirkland, WA (US); Joseph J. Johnson, Seattle, WA (US); Joseph L. Faulhaber, Bozeman, MT (US)

(73) Assignee: Microsoft Technology Licensing, LLC, Redmond, WA (US)

(*) Notice: Subject to any disclaimer, the term of this patent is extended or adjusted under 35 U.S.C. 154(b) by 109 days.

(21) Appl. No.: 13/161,950

(22) Filed: Jun. 16, 2011

(65) Prior Publication Data

US 2012/0297488 A1 Nov. 22, 2012

Related U.S. Application Data

(60) Provisional application No. 61/486,718, filed on May 16, 2011.

(51) Int. Cl.
*G06F 21/56* (2013.01)
*G06F 21/52* (2013.01)
(Continued)

(52) U.S. Cl.
CPC .............. *G06F 21/566* (2013.01); *G06F 21/52* (2013.01); *G06F 21/552* (2013.01);
(Continued)

(58) Field of Classification Search
CPC .... G06F 21/52; G06F 21/552; G06F 21/554; G06F 21/56; G06F 21/556; G06F 21/568; G06F 21/566; G06F 2221/2101; H04L 63/145

USPC .......................................................... 726/24
See application file for complete search history.

(56) References Cited

U.S. PATENT DOCUMENTS 5,978,917 A * 11/1999 Chi ................................ 726/22
7,089,591 B1 * 8/2006 Chi ................................ 726/24
(Continued)

OTHER PUBLICATIONS

Christodorescu, et al., "Mining Specifications of Malicious Behavior", Retrieved at <<http://pages.cs.wisc.edu/~mihai/publications/Mining%20Specifications%20of%20Malicious%20Behavior/Mining%20Specifications%20of%20Malicious%20Behavior.pdf>>, Proceedings of the 6th Joint Meeting of the European Software Engineering Conference and the ACM SIGSOFT Symposium on the Foundations of Software Engineering, Sep. 3-7, 2007, Dubrovnik, Croatia, pp. 10.

(Continued)

*Primary Examiner* — Theodore C Parsons
(74) *Attorney, Agent, or Firm* — Timothy Churna; Judy Yee; Micky Minhas

(57) ABSTRACT

The subject disclosure is directed towards detecting malware or possible malware in an input file by allowing the input file to be opened, and by monitoring for one or more behaviors corresponding to the open file that likely indicate malware. Only certain executable files and/or file types opened thereby may be monitored, with various collected event data used for antimalware purposes when improper behavior is observed. Example behaviors include writing of a file to storage, generation of network traffic, injection of a process, running of script, and/or writing system registry data. Telemetry data and/or a sample of the file may be sent to an antimalware service, and malware remediation may be performed. Data (e.g., the collected events) may be distributed to other nodes for use in antimalware detection, e.g., to block execution of a similar file.

20 Claims, 4 Drawing Sheets

(51) Int. Cl.
*G06F 21/55* (2013.01)
*H04L 29/06* (2006.01)

(52) U.S. Cl.
CPC ............ *G06F 21/554* (2013.01); *G06F 21/56* (2013.01); *G06F 21/568* (2013.01); *H04L 63/145* (2013.01); *G06F 2221/2101* (2013.01)

(56) References Cited

U.S. PATENT DOCUMENTS

| | | | |
|---|---|---|---|
| 7,188,367 B1* | 3/2007 | Edwards et al. | 726/24 |
| 7,784,098 B1* | 8/2010 | Fan et al. | 726/25 |
| 8,141,153 B1* | 3/2012 | Gardner et al. | 726/22 |
| 2003/0196103 A1* | 10/2003 | Edwards et al. | 713/200 |
| 2005/0154738 A1* | 7/2005 | Thomas et al. | 707/10 |
| 2005/0223239 A1* | 10/2005 | Dotan | 713/188 |
| 2005/0240769 A1* | 10/2005 | Gassoway | 713/176 |
| 2008/0040804 A1 | 2/2008 | Oliver et al. | |
| 2009/0038011 A1* | 2/2009 | Nadathur | 726/24 |
| 2009/0327688 A1 | 12/2009 | Li et al. | |
| 2010/0011029 A1 | 1/2010 | Niemela | |
| 2010/0031353 A1 | 2/2010 | Thomas et al. | |
| 2010/0031361 A1 | 2/2010 | Shukla | |
| 2010/0077481 A1* | 3/2010 | Polyakov et al. | 726/24 |
| 2011/0219451 A1* | 9/2011 | McDougal et al. | 726/23 |

OTHER PUBLICATIONS

Wang, et al., "Malware Detection Based on Suspicious Behavior Identification", Retrieved at <<http://ieeexplore.ieee.org/stamp/stamp.jsp?tp=&arnumber=4959020>>, 2009 First International Workshop on Education Technology and Computer Science, Mar. 7-8, 2009, pp. 198-202.

Rieck, et al., "Learning and Classification of Malware Behavior", Retrieved at <<http://134.2.173.143/laskov/papers/dimva2008.pdf>>, 2008, pp. 20.

* cited by examiner

DISCOVERING MALICIOUS INPUT FILES AND PERFORMING AUTOMATIC AND DISTRIBUTED REMEDIATION

CROSS-REFERENCE TO RELATED APPLICATION

The present application claims priority to U.S. provisional patent application Ser. No. 61/486,718, filed May 16, 2011.

BACKGROUND

Via the Internet, individuals and organizations with malicious intent distribute software that damages computer systems and/or is used to steal the personal information of users (including individual users or entities such as companies). Such malicious software, or malware, often exploits code vulnerabilities and/or gets installed onto users' computer systems by tricking end users/socially engineer end users into taking some action.

One particular exploit is to create malicious input files in well-known document formats, such as malicious Microsoft Word or .pdf documents, and trick users into opening them. Once opened, typically by exploiting vulnerabilities in the application, the malicious input files run and/or plant executable code that gives malware authors illicit control of their victim's computers and opens the system for attack.

Moreover, these malicious input files are also one of the biggest sources of re-infections, which may be generally defined as a reoccurrence of a malware threat with similar characteristics in a short period of time after it is believed to have been successfully removed.

In order to protect users, anti-malware vendors need to get samples of these malicious input files for analysis. In general, the more rapidly the files are obtained the better, so that remedial actions may be taken and other users may be protected.

However, heretofore there is no effective, rapid mechanism for distinguishing the small number of newly-created malicious input files from the vast number of new non-malicious input files that continuously appear across the Internet, so as to acquire samples of only the malicious ones for analysis. As a result, common scenarios where malware continually attacks the same machine in this way leads to a degraded user experience from repeated notifications, and wasted system and network resources from repeatedly addressing the infection and not the root cause, namely malicious input files.

Still further, as virtualized distributed environments become more prevalent, there exists a gap in preventing infection across such machines based on information collected from a subset. For example, if a malicious input file is discovered on only one particular machine, this is not used to inform other machines, and thus they risk becoming infected.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which malware is detected in an input file by allowing the input file to be opened, and by monitoring for one or more behaviors of the open file that likely correspond to malware, while recording events corresponding to the file. Only certain executable files and/or file types opened thereby may be monitored. Example behaviors that likely correspond to malware (performed by the running program or a process related to the running program) include writing of a file to storage, generation of network traffic, injection of a process, running of script, and/or writing system registry data.

When malware is detected, action to remediate the malware may be taken, e.g., quarantining the input file and/or any file written by the input file to storage. Telemetry data based upon the malware may be reported to an antimalware service, and a sample comprising at least part of the input file may be sent to an antimalware service.

In one aspect, antimalware mechanism includes a real time protection that notifies a malware protection engine component upon detection of opening of a file having a type associated with malware exploit behavior. The malware protection engine component collects information corresponding to the file. The real time protection component monitors operations corresponding to the file to watch for behavior indicative of potential malware. When such behavior is detected, the real time protection component notifies the malware protection engine component of the behavior, and the malware protection engine component takes action directed towards reporting data corresponding to the collected information and/or directed towards performing remediation with respect to the file. The behavior indicative of potential malware may comprise a particular event, a pattern of events, and/or a deviation from predetermined proper behavior.

In one aspect, collected events corresponding to behaviors indicative of possible malware in a file are used for antimalware detection. For example, the events may be used to report telemetry data. Data including at least some of the events may be distributed to at least one other node for use in antimalware detection, e.g., to block execution of a file based upon the received data.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
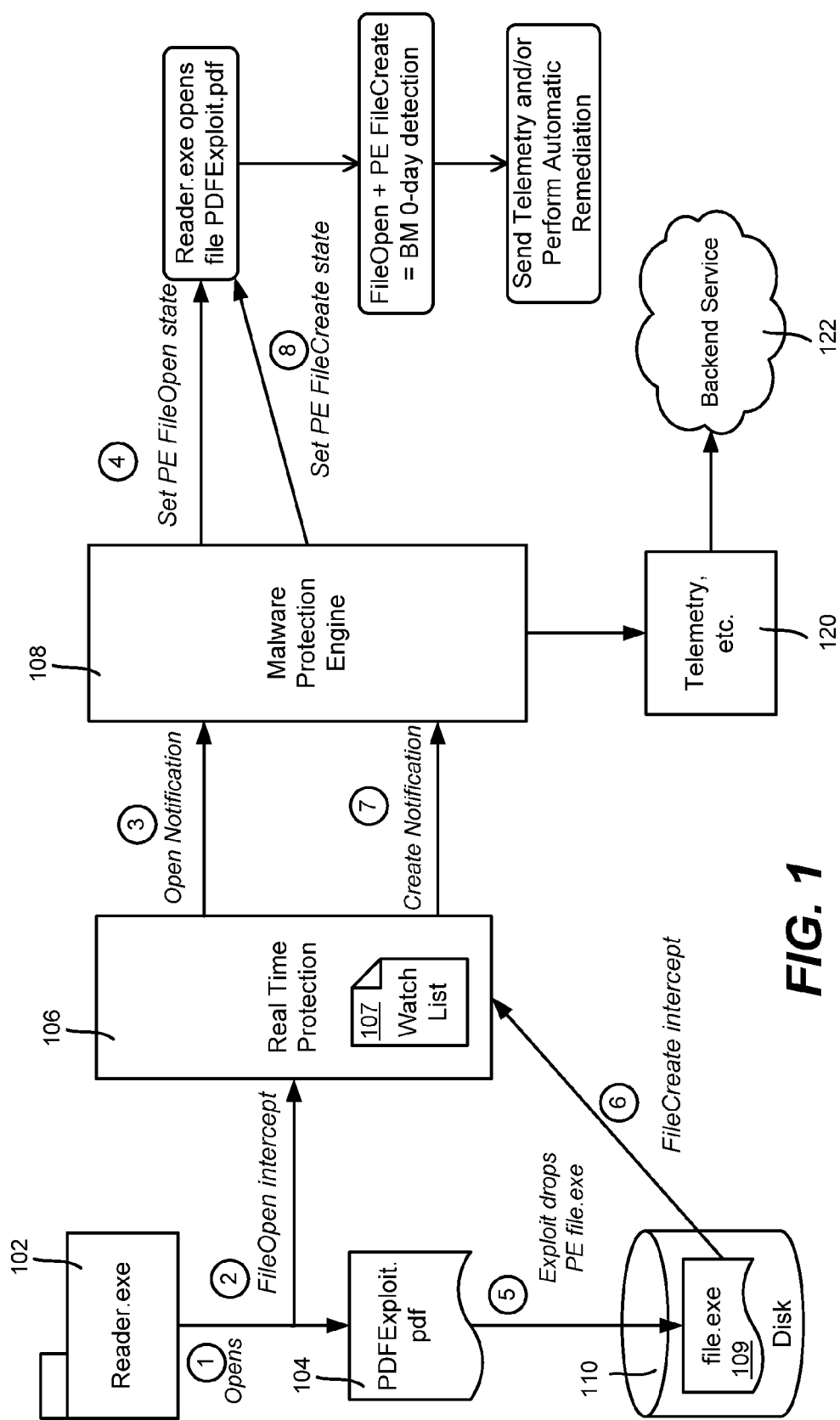
FIG. 1 is a block diagram showing example components in one implementation configured to discover malicious input files and perform automatic remediation.

Various aspects of the technology described herein are generally directed towards identifying which newly-created input files are likely malicious by allowing programs to open them. The technology then monitors (watches) such programs for signs of misbehavior that indicate compromise by a malicious input file.

In general, in order to achieve the malicious goals of a malware author, malicious input files cause the programs that open them to misbehave in an observable fashion. Based upon this knowledge, as described herein an automatic mechanism is constructed that remembers the input files opened by programs and remembers previous infections. When a program misbehaves in a manner that is consistent with having been compromised by a malicious input file, or a previous infection, some automatic remediation on the opened files is performed, (e.g., to clean, quarantine, acquire a sample for analysis, and/or report telemetry).

To this end, rather than identifying never-before-seen, newly-created malicious input files by considering attributes of the input files themselves, the technology described herein identifies which newly-created input files are likely malicious by allowing programs to open them. The technology then watches such programs for signs of misbehavior that indicate compromise by a malicious input file.

Once signs of misbehavior are detected, the technology remember facts, details, and context about (what appear to be) numerous seemingly insignificant events, so that upon observing a subsequent significant event, the technology can backtrack and make use of the events to draw conclusions that cannot be otherwise supported by the early seemingly-insignificant events or the later significant event when considered alone. In one example, the technology remembers facts, details, and context about files opened by programs. To an extent, such events also serve as forensic traces (e.g., a "fingerprint") indicative of malware behavior, and thus which similarly-behaving files are likely malware.

In one implementation, the technology correlates machine events related to infections within a pre-defined interval of time, and utilizes the potential source information to ascertain the source of the infections.

Moreover, in a distributed computing environment, data points corresponding to detected malware can be collected and correlated across several machines, such as in a one-host, multiple-guest operating system model. Using this data, proactive actions can be performed on machines that have not experienced/witnessed the malicious behavior. In a virtualized environment, the technology collects and correlates data in a distributed fashion, across various machines. Using this data, remediation actions may be performed across the machines in a centralized manner.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, networking and/or security in general.

FIG. 1 is a block diagram showing example components in one implementation. A program 102 that is configured to open .pdf files, shown herein as Reader.exe, is used to open a PDF file 104, (herein named PDFExploit.pdf to highlight its malicious objective). This is represented in FIG. 1 by the arrow labeled with circled numeral one (1).

As represented by the arrow labeled with circled numeral two (2), a real time protection component 106 intercepts the file open event on the system. Because the program 102 (Reader.exe) and file extension matches data on an input list 107 or the like provided by the malware protection engine 108 or another component, the real time protection component 106 sends an open notification (the arrow labeled three (3)) to the malware protection engine 108.

In one implementation the set of application/extension pairs are provided to the real time protection component 106 via an interface during initialization (e.g., during engine reload) of the real time protection component 106. The following is an example list containing some program: extension set pairs that may be watched:

Reader.exe: pdf (and any other actual program that reads .pdf files)
WinWord.exe: doc, docx
Excel.exe: xls, xlsx
Powerpoint.exe: ppt, pptx
Msaccess.exe: mdb, accdb To summarize, based on the above list, the real time protection component 106 checks to see if the above programs open any document with the provided extensions based on the pairing. If so, the real time protection component 106 fires an appropriate open notification to the malware protection engine 108.

When the file open notification is received, the malware protection engine 108 sets the state for the program's process (Reader.exe's process) as a "potential exploit process" as represented by the arrow labeled with circled numeral four (4). The file PDFExploit.pdf is stored recorded as associated with Reader.exe's process context as a potentially malicious document.

In general, once an application program has loaded an exploit file, the program 102 tends to exhibit behaviors that are not a normal usage pattern for the program 102. For example, a .pdf reader program typically does not drop portable executable (PE) files to storage (e.g., disk) and attempt to spawn them as processes. However, if the reader program is exploited by a malicious input file, one of the most commonly noticed behaviors is the dropping of such an executable file to disk and then attempting to launch it as a process. Thus, one form of detection is to watch for "creation of PE file on disk." Such behaviors may be watched for in any subset of application programs, such as those that are the most common targets for exploits.

In the example of FIG. 1 at labeled arrow five (5), the exploit of the reader program results in creation of a new executable file 109 (e.g., a portable executable) on the computer system's disk 110 or the like. As represented by the labeled arrow six, (6), the real time protection component 106 intercepts the file create event on the system.

The file will be scanned when closed (On-Close event). The scan results plus the file create event is sent to the malware protection engine 108 using another notification, as represented by the arrow labeled seven (7). The scan results contain information that the created file is an executable.

The malware protection engine 108 recognizes that the program 102 (reader.exe) corresponds to a "potential exploit" process. The file creation notification is used as a trigger to fire the detection operations by the malware protection engine 108 on the last stored malicious document, (which is PDFExploit.pdf), as represented by the arrow labeled eight (8).

As can be seen, the technology operates by allowing users to open and operate on input files (Microsoft® Word/Office documents, .pdf documents, music, pictures, video, other media, and interpretable scripts) as they do normally. The technology remembers the most recently opened documents and their source (such as external sources like the Internet). Unlike previous approaches, facts, details, and context about numerous seemingly insignificant events are recorded. Although most of these facts will turn out to be insignificant, the significance of the few may become apparent only upon backtracking from some later event, unlike state-machine-based approaches to access control and intrusion detection.

The technology observes the program's process, to watch for unexpected behaviors. This may be watching for specific misbehaviors and/or watching for deviations from a definition of proper behavior. Misbehavior may be defined a single event, such as writing an executable file to the file system (which for example may be triggered at a later time by another opened malicious input file), or patterns of misbehaviors (writing, followed by launching, and so forth). The misbehavior/deviant behavior may be by the running program directly, or indirectly by a process related to the running program, e.g., by or because of a process (including file) launched by the running program, at any level of indirection. Other improper behaviors may be generating network traffic, process injection, writing to the registry, running scripts, abnormal browser behavior/traffic, and so forth. Heuristics may be used, such as based upon known good context; for example, it may be acceptable for a program to write certain files to disk in response to a known user operation, but not before the user operation occurs or after some known end to that particular operation.

If the watched process misbehaves, this may be due to an opened document being malicious, particularly if documents came from likely dangerous sources. Note that this is unlike previous solutions, because the technology identifies potentially-malicious input files by observing the behavior of the programs that opened them, rather than by examining the input files themselves.

Moreover, information regarding previous infections on the system also may be correlated (as previously-attacked machines are the most likely to again be exploited or infected). For example, before being detected, malware may reduce security on an infected machine (e.g., turn off a firewall, change registry settings (e.g., to disable auto-update mechanisms), turn off antimalware processes and so on), making that machine more vulnerable to re-infection. In such a situation, after detection, the machine may more aggressively look for traces of malware, provide warnings, operate in a "paranoid" mode for a period of time, and so forth. For example, after rolling back what happened, the firewall can be turned back on, the user can be prompted to re-check security settings and/or restore the system to a prior state, and so forth.

Turning to performing remediation, possible forms of remediation include reporting telemetry (block 120) on opened documents from specifically dangerous sources to a backend service for analysis, and/or sending samples of opened documents from likely or specifically dangerous sources (block 120) to a backend service 122 for analysis. Other forms of remediation (that may be done along with reporting/sending samples) include to quarantine, block or otherwise clean opened documents and other associated processes, files and/or data sources, e.g., after querying user services and/or backend services 122 as needed.

Figure 2:
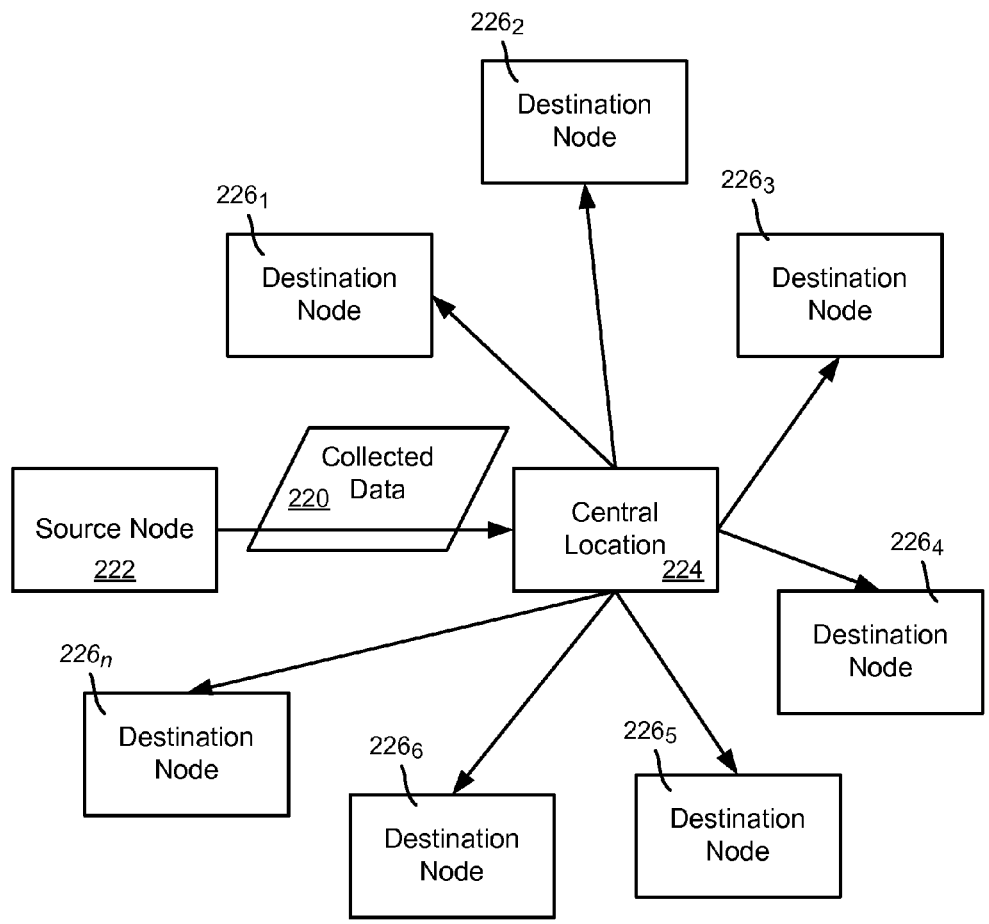
FIG. 2 is a block diagram showing example distribution of collected antimalware-related data among distributed/virtualized nodes.

Turning to another aspect, in a distributed environment such as represented in FIG. 2, data 220 collected from one (source) node 222 (e.g., a guest operating system) may be uploaded to a centralized location 224, where it is mined for relevant information. This information is communicated from one node the other (destination) nodes $226_1$-$226_n$ to proactively deal with potential infections. For example, information about the malicious payload may be communicated to other nodes, whereby those nodes can watch for that payload, independent of the mechanism (input file type/corresponding program, name, other content) used to deliver that payload. In this way, a malware payload detected in a .pdf file may be used to block malware in a .docx file, for example, even if not yet having been detected via .docx files.

As a result of such knowledge distribution, a machine that is not protected against an exploit may be warned in advance by another machine (that was exploited), and may take proactive defensive measures against that exploit in the event that the malware (as a file and/or its malicious payload) does reach the machine. Other multi-node environments, such as virtualized machines within a machine, peer-to-peer networks and so forth may similarly distribute malware-protection/remediation-related data.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 3:
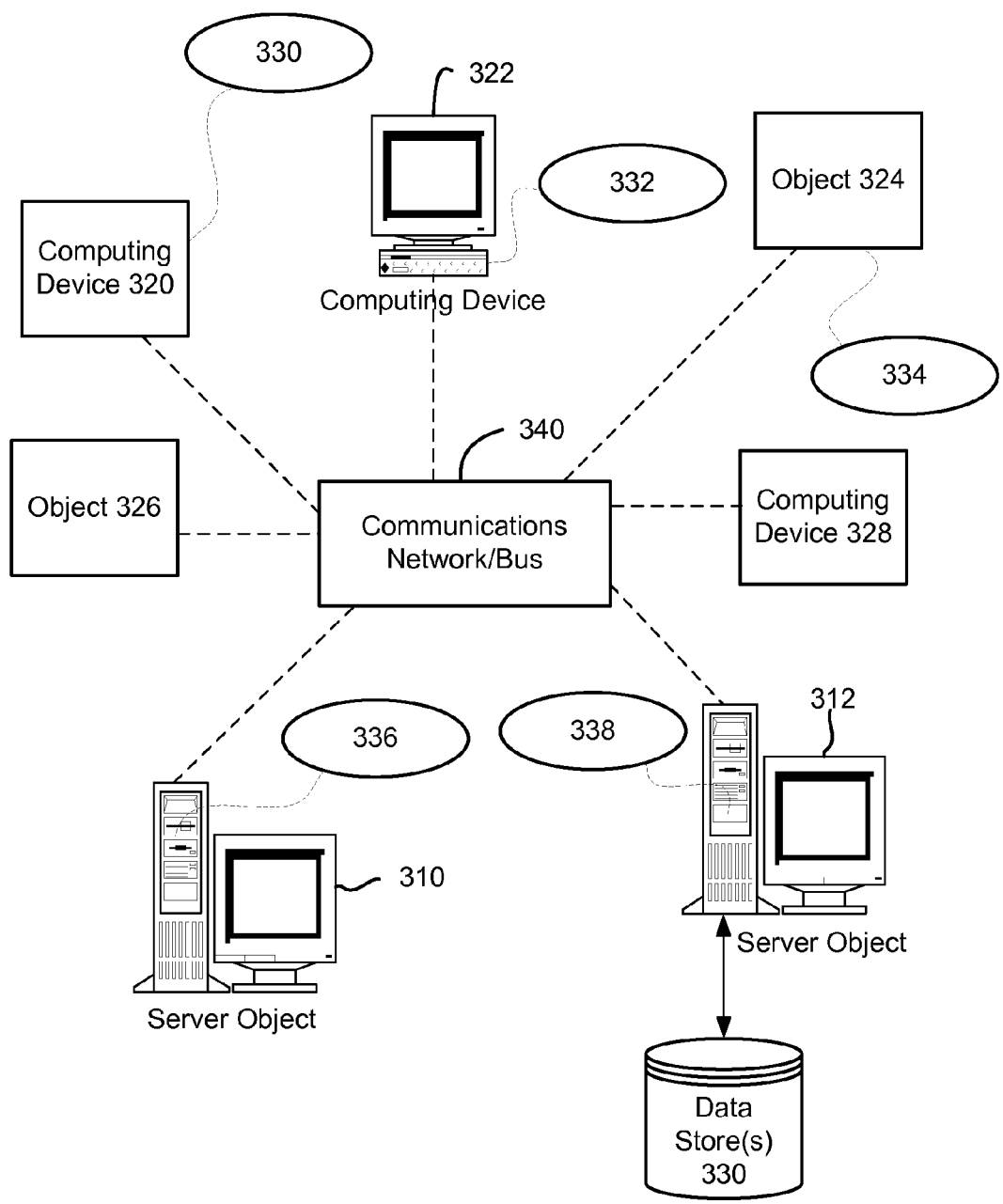
FIG. 3 is a block diagram representing exemplary non-limiting networked environments in which various embodiments described herein can be implemented.

FIG. 3 provides a schematic diagram of an exemplary networked or distributed computing environment. The distributed computing environment comprises computing objects 310, 312, etc., and computing objects or devices 320, 322, 324, 326, 328, etc., which may include programs, methods, data stores, programmable logic, etc. as represented by example applications 330, 332, 334, 336, 338. It can be appreciated that computing objects 310, 312, etc. and computing objects or devices 320, 322, 324, 326, 328, etc. may comprise different devices, such as personal digital assistants (PDAs), audio/video devices, mobile phones, MP3 players, personal computers, laptops, etc.

Each computing object 310, 312, etc. and computing objects or devices 320, 322, 324, 326, 328, etc. can communicate with one or more other computing objects 310, 312, etc. and computing objects or devices 320, 322, 324, 326, 328, etc. by way of the communications network 340, either directly or indirectly. Even though illustrated as a single element in FIG. 3, communications network 340 may comprise other computing objects and computing devices that provide services to the system of FIG. 3, and/or may represent multiple interconnected networks, which are not shown. Each computing object 310, 312, etc. or computing object or device 320, 322, 324, 326, 328, etc. can also contain an application, such as applications 330, 332, 334, 336, 338, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 3, as a non-limiting example, computing objects or devices 320, 322, 324, 326, 328, etc. can be thought of as clients and computing objects 310, 312, etc. can be thought of as servers where computing objects 310, 312, etc., acting as servers provide data services, such as receiving data from client computing objects or devices 320, 322, 324, 326, 328, etc., storing of data, processing of data, transmitting data to client computing objects or devices 320, 322, 324, 326, 328, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 340 or bus is the Internet, for example, the computing objects 310, 312, etc. can be Web servers with which other computing objects or devices 320, 322, 324, 326, 328, etc. communicate via any of a number of known protocols, such as the hypertext transfer protocol (HTTP). Computing objects 310, 312, etc. acting as servers may also serve as clients, e.g., computing objects or devices 320, 322, 324, 326, 328, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 9 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 4:
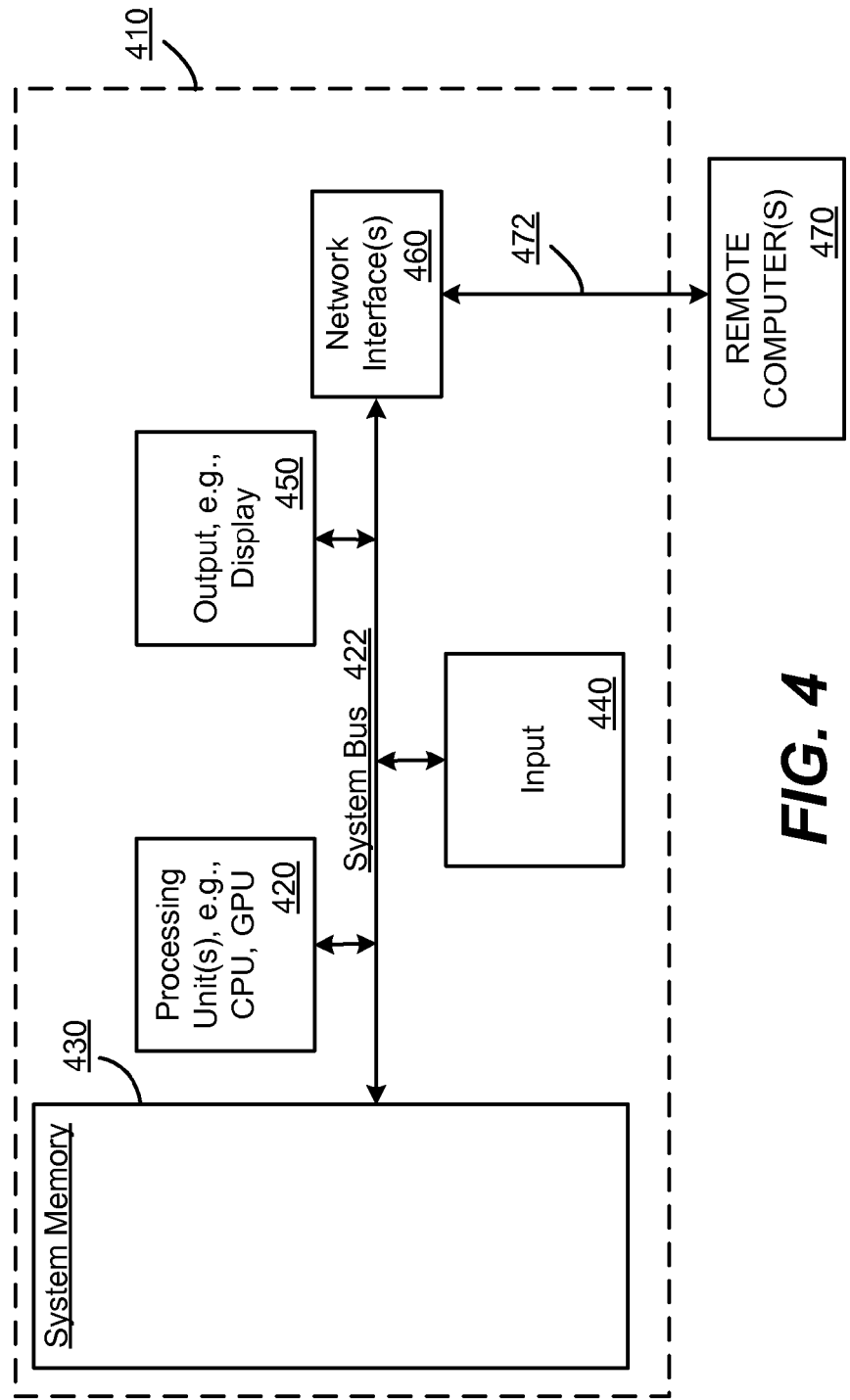
FIG. 4 is a block diagram representing an exemplary non-limiting computing system or operating environment in which one or more aspects of various embodiments described herein can be implemented.

FIG. 4 thus illustrates an example of a suitable computing system environment 400 in which one or aspects of the embodiments described herein can be implemented, although as made clear above, the computing system environment 400 is only one example of a suitable computing environment and is not intended to suggest any limitation as to scope of use or functionality. In addition, the computing system environment 400 is not intended to be interpreted as having any dependency relating to any one or combination of components illustrated in the exemplary computing system environment 400.

With reference to FIG. 4, an exemplary remote device for implementing one or more embodiments includes a general purpose computing device in the form of a computer 410. Components of computer 410 may include, but are not limited to, a processing unit 420, a system memory 430, and a system bus 422 that couples various system components including the system memory to the processing unit 420.

Computer 410 typically includes a variety of computer readable media and can be any available media that can be accessed by computer 410. The system memory 430 may include computer storage media in the form of volatile and/or nonvolatile memory such as read only memory (ROM) and/or random access memory (RAM). By way of example, and not limitation, system memory 430 may also include an operating system, application programs, other program modules, and program data.

A user can enter commands and information into the computer 410 through input devices 440. A monitor or other type of display device is also connected to the system bus 422 via an interface, such as output interface 450. In addition to a monitor, computers can also include other peripheral output devices such as speakers and a printer, which may be connected through output interface 450.

The computer 410 may operate in a networked or distributed environment using logical connections to one or more other remote computers, such as remote computer 470. The remote computer 470 may be a personal computer, a server, a router, a network PC, a peer device or other common network node, or any other remote media consumption or transmission device, and may include any or all of the elements described above relative to the computer 410. The logical connections depicted in FIG. 4 include a network 472, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
    intercepting, by a real time protection component, a file open event by a program corresponding to an input file;
    allowing the input file to be opened by the program during normal user operation;
    responsive to the input file being opened normally by the program, initiating monitoring of the program for one or more behaviors that indicate possible malware;
    recording events initiated by the program corresponding to the input file and a source associated with the input file;
    responsive to the program closing the input file, scanning the input file to generate scan results and terminating the monitoring of the program; and
    analyzing the recorded events, the source associated with the input file, and the scan results to determine a potential source of an infection, including by identifying the one or more behaviors of the program that indicate possible malware using the analysis.

2. The method of claim 1 wherein said monitoring for the one or more behaviors comprises watching for writing of a file to storage by the program that opened the input file or a process related to the program that opened the input file.

3. The method of claim 1 wherein said monitoring for the one or more behaviors comprises watching for generation of network traffic by the program that opened the input file or a process related to the program that opened the input file.

4. The method of claim 1 wherein said monitoring for the one or more behaviors comprises watching for injection of at least one process by the program that opened the input file or a process related to the program that opened the input file.

5. The method of claim 1 wherein said monitoring for the one or more behaviors comprises watching for running of one or more scripts by the program that opened the input file or a process related to the program that opened the input file.

6. The method of claim 1 wherein said monitoring for the one or more behaviors comprises watching for writing of data to a system registry by the program that opened the input file or a process related to the program that opened the input file.

7. The method of claim 1 further comprising:
distributing information regarding malware corresponding to the input file to at least one other machine comprising a node in a distributed or virtualized computing environment.

8. The method of claim 1 further comprising:
taking action to remediate malware corresponding to the input file.

9. The method of claim 1 further comprising:
taking action to remediate malware corresponding to the input file, including quarantining the input file.

10. The method of claim 1 wherein said monitoring for the one or more behaviors comprises watching for writing of a dropped file to storage by the program that opened the input file or a process related to the program that opened the input file, and further comprising:
taking action to remediate malware corresponding to the input file, including quarantining the dropped file.

11. The method of claim 1 further comprising:
reporting telemetry data based upon malware corresponding to the input file to an antimalware service.

12. The method of claim 1 further comprising:
sending a sample comprising at least part of the input file to an antimalware service.

13. In a computing environment, a system comprising:
a malware protection engine configured to:
collect information corresponding to program behaviors and input files; and
take action directed towards at least one of reporting data corresponding to the collected information or performing remediation with respect to the information; and
a real time protection component communicatively coupled to the malware protection engine and configured to:
intercept a file open event by a program requesting to open an input file;
allow the program to open the input file normally;
responsive to the input file being opened normally by the program, initiate monitoring operations of the program for one or more behaviors indicative of potential malware;
record events initiated by the program that correspond to the input file and a source associated with the input file;
notify the malware protection engine at least based on at least one of detection of the input file opened by the program having a file type associated with malware exploit behavior or detection of the one or more behaviors indicative of the potential malware during the operations by the program; and
responsive to the program closing the input file, terminating the monitoring of the program.

14. The system of claim 13 wherein at least part of the information corresponding to the program behaviors and the input files is distributed to one or more nodes in a distributed or virtualized computing environment.

15. The system of claim 13 wherein the real time protection component is configured to evaluate the program that is opening the file type associated with malware exploit behavior against a predetermined list to determine whether the file type is associated with malware exploit behavior.

16. The system of claim 13 wherein the behavior indicative of potential malware comprises a particular event, a pattern of events, or a deviation from predetermined proper behavior, or any combination of particular event, a pattern of events, or a deviation from predetermined proper behavior.

17. The system of claim 13 further comprising:
an antimalware service, the malware protection engine reporting the collected information to the antimalware service, including sending telemetry data to the antimalware service, or sending at least part of a file to the antimalware service, or both.

18. One or more computer storage devices having computer-executable instructions, which on execution by a computer cause the computer to perform operations, comprising:
intercepting a file open event by a program corresponding to an input file;
allowing the program to open the input file;
responsive to the input file being opened by the program, initiating monitoring of the program during normal user operation for one or more behaviors indicative of possible malware during the processing of the input file by the program;
recording information corresponding to events initiated by the program with respect to the input file and a source of the input file;
detecting a behavior of the program indicative of possible malware;
analyzing the recorded information and the source of the input file to determine a potential source of an infection; and
responsive to the program closing the input file, terminating the monitoring of the program.

19. The one or more computer storage devices of claim 18 wherein analyzing at least some of the events comprises reporting telemetry data, or distributing data including at least some of the events to at least one other node for use in antimalware detection, or both.

20. The one or more computer storage devices of claim 18 wherein analyzing at least some of the events comprises distributing data including at least some of the events to at least one other node for use in antimalware detection, and having further computer-executable instructions comprising:
quarantining the input file based upon the data.

* * * * *